United States Patent
Ng

(10) Patent No.: US 8,971,347 B2
(45) Date of Patent: Mar. 3, 2015

(54) METHOD FOR CONFIGURING PHICH CARRIER LINKAGE

(75) Inventor: Boon Loong Ng, Victoria (AU)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 415 days.

(21) Appl. No.: 13/387,576

(22) PCT Filed: Jul. 23, 2010

(86) PCT No.: PCT/JP2010/062970
§ 371 (c)(1),
(2), (4) Date: Jan. 27, 2012

(87) PCT Pub. No.: WO2011/018952
PCT Pub. Date: Feb. 17, 2011

(65) Prior Publication Data
US 2012/0120909 A1 May 17, 2012

(30) Foreign Application Priority Data
Aug. 14, 2009 (AU) .................... 2009903829

(51) Int. Cl.
*H04J 3/16* (2006.01)
*H04W 72/04* (2009.01)
*H04L 5/00* (2006.01)
(Continued)

(52) U.S. Cl.
CPC ........ *H04W 72/042* (2013.01); *H04W 72/1289* (2013.01); *H04L 5/0057* (2013.01); *H04L 5/0098* (2013.01); *H04L 5/0094* (2013.01); *H04W 74/006* (2013.01); *H04L 5/0091* (2013.01); *H04W 72/0406* (2013.01); *H04W 72/0413* (2013.01); *H04L 5/0055* (2013.01); *H04L 5/0075* (2013.01); *H04W 72/1294* (2013.01); *H04L 5/0096* (2013.01); *H04L 5/0053* (2013.01); *H04W 72/1278* (2013.01); *H04L 5/0071* (2013.01); *H04L 5/0092* (2013.01);
(Continued)

(58) Field of Classification Search
CPC ... H04L 5/0091; H04L 5/0092; H04L 5/0094; H04L 5/0096; H04L 5/0098; H04L 5/0053; H04L 5/0055; H04L 5/0057; H04L 5/0071; H04L 5/0075; H04W 72/0406; H04W 72/0413; H04W 72/042; H04W 72/0453; H04W 72/1278; H04W 72/1289; H04W 72/1294; H04W 72/14; H04W 74/006
USPC .................................................. 370/329, 437
See application file for complete search history.

(56) References Cited

U.S. PATENT DOCUMENTS

| | | | |
|---|---|---|---|
| 2009/0175233 A1* | 7/2009 | Ojala et al. | 370/329 |
| 2010/0232546 A1* | 9/2010 | Yu et al. | 375/300 |
| 2010/0284347 A1* | 11/2010 | Ahn et al. | 370/329 |

OTHER PUBLICATIONS

"PHICH Linkage for symmetric carrier aggregation", 3GPP TSG RAN WG1 $56bis, R1-091169, Mar. 23-27, 2009, Panasonic.*

(Continued)

*Primary Examiner* — Peter Cheng
(74) *Attorney, Agent, or Firm* — Young & Thompson

(57) ABSTRACT

There is provided a method of configuring the downlink component carrier between one or more linkage methods for PHICH reception on User Equipment (UE), which is configured for carrier aggregation, over a mobile communication network. This method includes (a) providing an indicator, and (b) determining whether the PHICH carrier linkage should be dynamic linkage or cell specific, based on the value of the indicator.

7 Claims, 3 Drawing Sheets

(51) Int. Cl.
*H04W 74/00* (2009.01)
*H04W 72/14* (2009.01)
*H04W 72/12* (2009.01)

(52) U.S. Cl.
CPC .......... *H04W 72/0453* (2013.01); *H04W 72/14* (2013.01)
USPC ........................................................ 370/437

(56) References Cited

OTHER PUBLICATIONS

International Search Report, PCT/JP2010/062970, Dec. 7, 2010.
NEC Group, PHICH carrier linkage for carrier aggregation, 3GPP TSG-RAN WG1 Meeting #58 R1-093227, Aug. 24, 2009, Whole document.
Panasonic, PHICH Linkage for asymmetric carrier aggregation, 3GPP TSG RAN WG1 Meeting #56bis R1-091169, Mar. 23, 2009, Whole document.
Samsung, PHICH Transmission in LTE-A, 3GPP TSG RAN WG1 #56bis R1-091237, Mar. 23, 2009, Whole document.
LG Electronics, Issues on DL/UL Control Signalling in Asymmetric Carrier Aggregation, 3GPP TSG RAN WG1 Meeting #57 R1-092127, May 4, 2009, Whole document.
NEC Group, Phich mapping issues for asymmetric carrier aggregation, 3GPP TSG-RAN WG1 Meeting #57 R1-091691, May 4, 2009, Whole document.
Panasonic, Further considerations on PHICH Linkage for carrier aggregation, 3GPP TSG RAN WG1 Meeting #57bis R1-092534, Jun. 29, 2009, Whole document.

\* cited by examiner

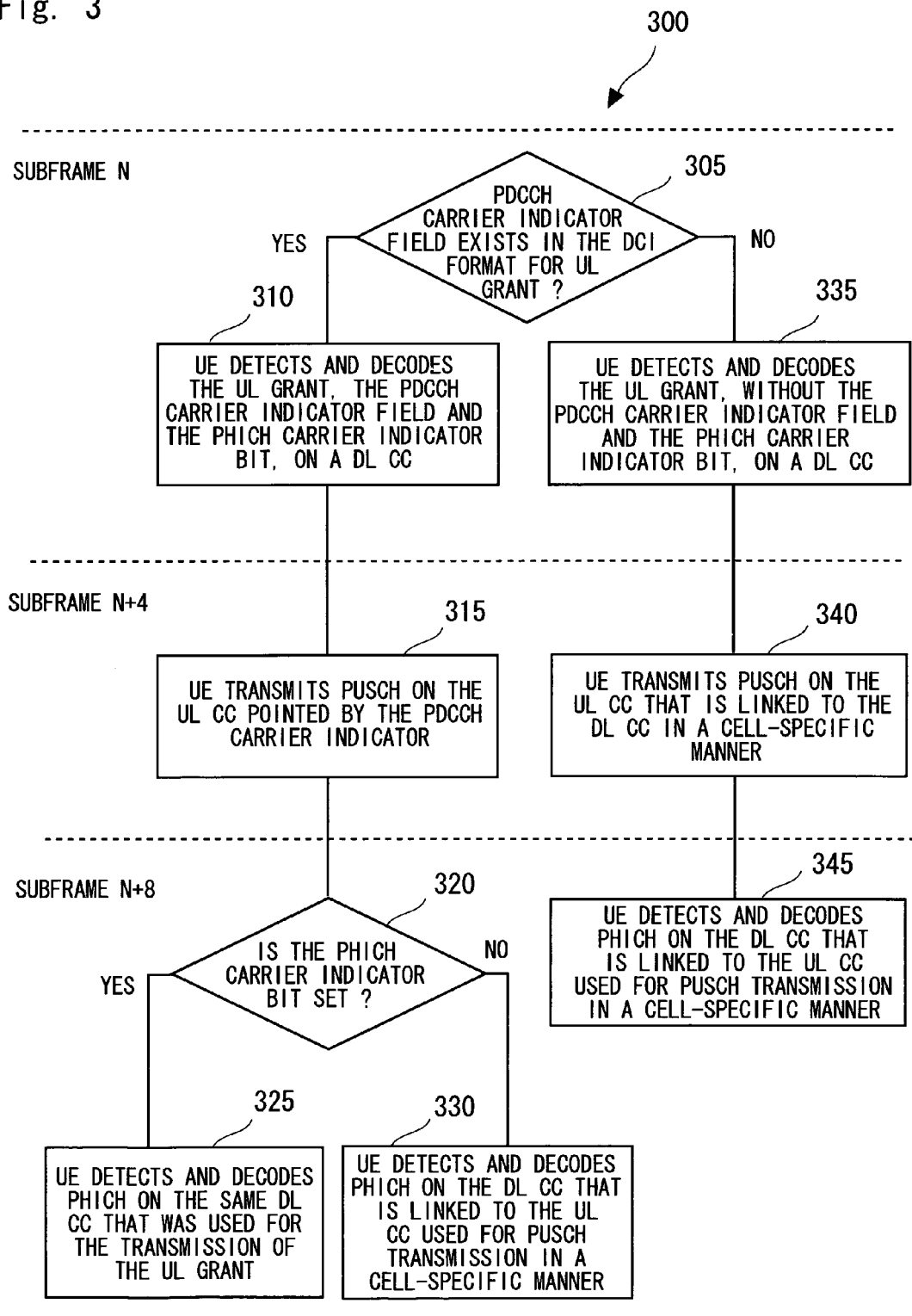

METHOD FOR CONFIGURING PHICH CARRIER LINKAGE

TECHNICAL FIELD

The present invention relates to wireless communications systems, and more particularly to a method for configuring the downlink component carrier between one or more Physical Hybrid-ARQ Indicator Channel (PHICH) carrier linkage methods.

BACKGROUND ART

Long Term Evolution-Advanced (LTE-A) is an evolving mobile communication standard which aims to take advantage of 3G mobile communications devices. A feature of LTE-A is carrier aggregation where two or more component carriers are aggregated in order to support wider transmission bandwidths.

It is thought that carrier aggregation will be User Equipment (UE) specific, i.e. each UE in the same cell in a mobile communication network may have different configuration of carrier aggregation.

If the carrier aggregation is symmetric (i.e. same number of downlink component carriers and uplink component carriers), the downlink (DL)/uplink (UL) component carriers are typically associated in pairs in a cell-specific manner. However, in the case of asymmetric carrier aggregation, more than one DL component carriers may be associated in a cell-specific manner with a UL component carrier if there are more DL component carriers than UL component carriers and vice versa.

Once a UE is configured with carrier aggregation, the UE is capable of simultaneously receiving or transmitting on all the component carriers that are aggregated. Thus, the UE may be scheduled over multiple component carriers simultaneously.

Typically, UE is only permitted to transmit on Physical Uplink Shared Channel (PUSCH) on a particular UL component carrier after it has received an UL grant. After the UE has transmitted data on PUSCH on the UL component carrier, ACK/NACK is expected to be transmitted from the associated eNodeB. A problem that arises is which DL component carrier should be used for the PHICH transmission when there are more than one DL component carriers available.

The issue of PHICH carrier linkage is also related to the issue of Physical Downlink Control Channel (PDCCH)-to-PUSCH linkage currently being considered in 3GPP.

There have been attempts at two options to solve the problem of PHICH carrier linkage, namely: (1) DL component carrier for PHICH transmission being the same as that used for the transmission of the UL grant; or (2) DL component carrier for PHICH transmission being linked to the UL component carrier used for PUSCH transmission in a cell-specific manner.

SUMMARY OF INVENTION

Technical Problem

A problem with option 1 is that it is not always beneficial to force the PHICH transmission to be on the DL component carrier where the UL grant was transmitted (particularly in a heterogeneous network which is common in mobile communications networks). Further, there is a potential further problem in that the total PHICH resources in each component carrier are semi-statically configured (via the Physical Broadcast Channel) and hence the PHICH capacity cannot be adjusted dynamically. If PDCCH and the corresponding PHICH can be scheduled on any DL component carrier dynamically, a significant amount of PHICH resources may need to be provisioned for each component carrier in order to prevent PHICH blocking (where PHICH cannot be scheduled due to the lack of resources). However, the utilization of the PHICH resources could be low since only a relatively small number of PHICH resources compared to the total PHICH resources available will be used at any one time.

Another problem with option 1 is when there are two UL grants for two different UEs transmitted on the same DL component carrier, granting PUSCH transmissions on two separate UL component carriers. PHICH resource collision may occur if the lowest of UL Physical Resource Block (PRB) indices and the Demodulation Reference Signal (DM RS) cyclic shifts for each UL component carrier coincide. While this collision may be avoided via assignment of different DM RS cyclic shift in the UL grants, it also means that for each UL component carrier, one fewer UE can be spatially multiplexed in the UL for UL Multi-User Multiple-Input Multiple-Output (MU-MIMO) operation.

Furthermore, option 2 is not effective when PHICH needs to be protected from a DL component carrier with high interference (e.g. particularly in a heterogeneous network which is common in mobile communications networks).

In light of the above, it would be desirable to provide, for a UE that is carrier aggregation enabled, a downlink (DL) component carrier used for Physical Hybrid-ARQ Indicator Channel (PHICH) transmission to be configurable at the User Equipment (UE).

It will be appreciated that a reference herein to any matter which is given as prior art is not to be taken as an admission that that matter was, in Australia or elsewhere, known or that the information it contains was part of the common general knowledge as at the priority date of the claims forming part of this specification.

Solution to Problem

With this in mind, one aspect of the present invention provides a method of configuring the downlink component carrier between one or more linkage methods for PHICH reception on User Equipment (UE) over a mobile communication network, the UE configured for carrier aggregation, including the steps of:

(a) providing an indicator;

(b) determining whether the PHICH carrier linkage should be dynamic linkage or cell specific, based on the value of the indicator.

Preferably, the indicator is a single bit in a signal. Preferably, the indicator is a single bit located in the uplink (UL) grant.

Preferably, the indicator is a single bit located in DCI formats for the UL grant.

Preferably, the indicator bit is introduced in DCI formats for UL grant and the indicator bit only exists in DCI formats if a PDCCH carrier indicator also exists.

Preferably, the indicator is a single bit located in the higher layer signalling.

Preferably, the higher layer signalling includes the Radio Resource Control (RRC) signalling, or Medium Access Control (MAC) signalling.

Preferably, if at step (b), the PHICH carrier linkage should be dynamic, the method further includes the step of transmitting on the downlink (DL) component carrier used for the UL grant transmission.

Preferably, the method further includes the step of an eNodeB associated with the mobile communication network setting the PHICH carrier linkage as determined in step (b).

Advantageous Effects of Invention

Advantageously the invention enables, in the event that carrier aggregation is configured with a particular UE, the downlink component carrier to be used for PHICH transmission and is configurable at the user equipment (UE) between two linkage methods, namely a method that is based on the DL component carrier used for the UL grant and a method that is based on cell-specific UL/DL component carrier linkage.

In a further advantage, the present invention only incurs minimal cost in terms of signalling to the UE (e.g., only one bit in the DCI formats if it is explicitly signalled).

Advantageously, if the PHICH carrier indicator bit is introduced in DCI formats for UL grant, it only needs to exist in DCI formats with PDCCH carrier indicator and this arrangement ensures that the total number of blind decoding attempts required to be performed by the UE is not affected by the introduction of the PHICH carrier indicator bit.

BRIEF DESCRIPTION OF DRAWINGS

FIG. 3 is a flow diagram of the method of the present invention.

DESCRIPTION OF EMBODIMENTS

Figure 1A:
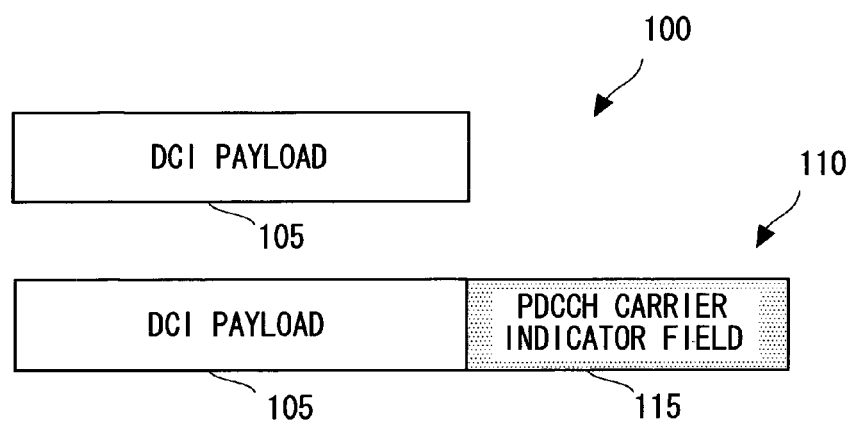
FIG. 1A is a schematic diagram of a UL grant in an existing LTE-A system.

The following description refers in more detail to the various features and steps of the present invention. To facilitate an understanding of the invention, reference is made in the description to the accompanying drawings where the invention is illustrated in a preferred embodiment. It is to be understood however that the invention is not limited to the preferred embodiment illustrated in the drawings.

Referring now to FIG. 1A, there is shown a schematic diagram of a UL grant in an existing LTE-A system. In this case, a sub-frame 100 includes a DCI payload 105 but does not include a PDCCH carrier indicator field. Also shown is an alternative sub-frame 110 which includes a DCI payload 105, but this time includes a PDCCH carrier indicator field 115.

Figure 1B:
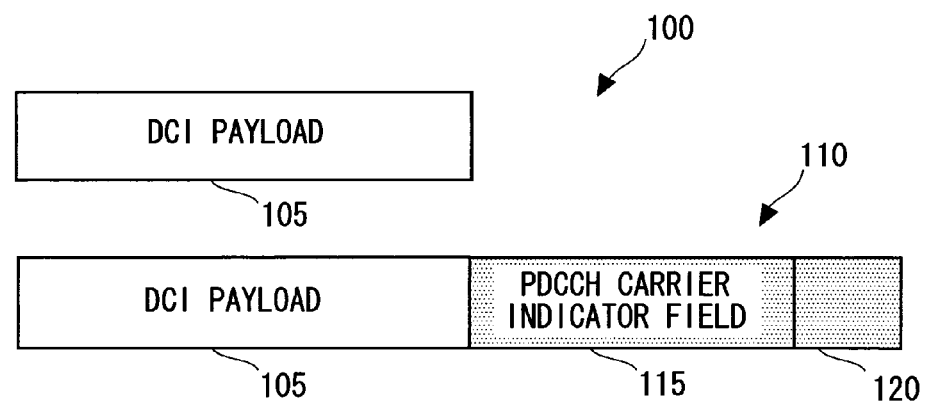
FIG. 1B is a schematic diagram of a UL grant of the present invention.

FIG. 1B is a schematic diagram of a UL grant of the present invention. Also shown is a sub-frame 100 which includes a DCI payload 105. A sub-frame 110 which includes a DCI payload 105 and a PDCCH carrier indicator field 115 is also shown. Further included is a PHICH carrier indicator bit 120. The PHICH carrier indicator bit 120 only exists if the PDCCH carrier indicator field 115 also exists in the UL grant. In particular, the present invention introduces a single bit, namely the PHICH carrier indicator bit 120 in the UL grant or alternatively in the higher layer signalling (e.g., radio resource control signalling) to indicate if the PHICH carrier linkage should be based on the DL component carrier used for the UL grant (for ease of reference referred to as dynamic linkage) or the Cell-specific UL/DL component carrier linkage (for ease of reference referred to as cell-specific linkage). Advantageously, if the PHICH carrier indicator bit 120 is introduced in DCI formats for UL grant, it only needs to exist in DCI formats with PDCCH carrier indicator field 115 as shown in the sub-frame 110 of FIG. 1B. Advantageously, this arrangement ensures that the total number of blind decoding attempts required to be performed by the UE is not affected by the introduction of the PHICH carrier indicator bit 120.

The operation using the PHICH carrier indicator bit 120 is as follows: for example, the cell-specific linkage can be based on the cell-specific UL/DL component carrier pairing (according to the default transmit receive separation or the UL-Carrier Freq parameter in System Information Block 2 (SIB2) or be based on high-layer signalling, such as RRC, broadcasted to all UEs in the cell.

Preferably an eNodeB (not shown) sets the PHICH carrier linkage to be dynamic or cell-specific according to its need. If the PDCCH carrier indicator field 115 is configured by the eNodeB and if the eNodeB sends an UL grant with the PDCCH carrier indicator field 115 and the PHICH carrier indicator bit 120 indicating cell-specific linkage, the UE, upon detection of the UL grant and the PHICH carrier indicator bit 120, shall assume the DL component carrier for the PHICH is determined by cell-specific linkage with the UL component carrier used for the corresponding PUSCH transmission.

Similarly, if the eNodeB uses the PHICH carrier indicator bit 120 to indicate the dynamic linkage to the UE, then the UE assumes that the PHICH is to be transmitted on the DL component carrier that was used for transmission of the UL grant.

Figure 2:
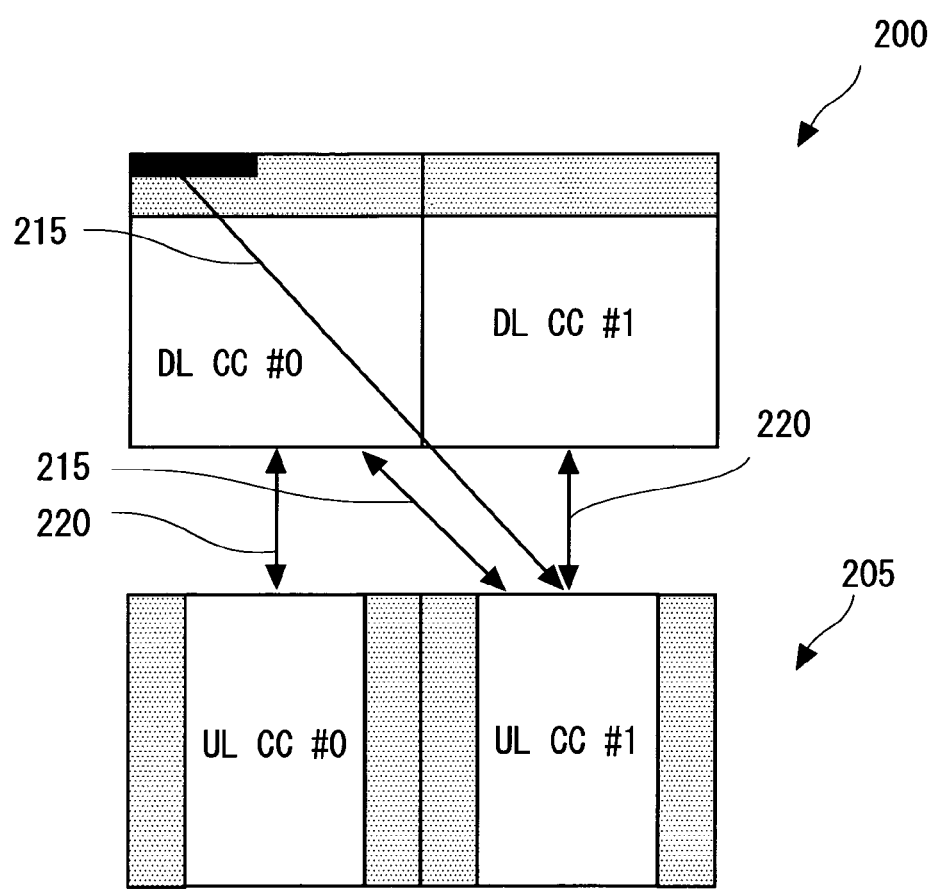
FIG. 2 is schematic diagram of carrier aggregation having PHICH dynamic linkage and cell-specific linkage according to the invention.

This is best shown in FIG. 2 which is a schematic diagram of carrier aggregation having PHICH dynamic linkage and a cell-specific linkage according to the invention. FIG. 2 includes two DL carrier components 200 (DL CC #0 and DL CC #1) and two UL carrier components 205 (DL CC #0 and DL CC #1). UL CC #0 and UL CC#1 are linked to DL CC #0 and DL CC #1 respectively by a cell-specific linkage 220. Alternatively, UL CC #1 and DL CC #0 are linked via dynamic linkage 215. As an example, the UL grant for UL CC #1 is transmitted in DL CC #0. If the PHICH carrier indicator bit 120 is set to indicate dynamic linkage, then the corresponding PHICH is transmitted on DL CC #0. Otherwise, if cell-specific linkage is indicated via the PHICH carrier indicator bit 120, then the corresponding PHICH is transmitted on DL CC #1. Advantageously the invention enables, in the event that carrier aggregation is configured with a particular UE, the DL component carrier to be used for PHICH transmission and is configurable at the UE between two linkage methods, namely a method that is based on the DL component carrier used for the UL grant and a method that is based on cell-specific UL/DL component carrier linkage.

In a further advantage the arrangement of the present invention exploits the advantages provided by the two methods, in particular, the invention enables cell specific UL/DL component carrier linkage that allows decoupling of PDCCH scheduling and PHICH scheduling. As a result, the PDCCH scheduling across component carriers can be dynamic and the configuration of total PHICH resources available for each component carrier can be relatively static. A further advantage of the present invention enables PHICH scheduling flexibility when needed, by allowing PHICH to be transmitted on the DL component carrier that was used for transmission of the UL grant which can also be flexible through the use of the PHICH carrier indicator bit 120. This is advantageous for deployment scenarios (e.g. in heterogeneous networks) where some DL component carriers may be experiencing high interference and the control channels (PDCCH and PHICH) of those interference-dominated DL component carriers need to be protected by transmitting them on another DL component carrier with lower interference.

A further advantage of the present invention is to provide flexible association of UL/DL component carriers for PHICH transmission when UE-specific asymmetric carrier aggregation is configured in such a way that cell-specific UL/DL component carrier linkage cannot be applied.

In a further advantage, the present invention only incurs minimal cost in terms of signalling to the UE (e.g., only one bit in the DCI formats if it is explicitly signalled).

FIG. 3 shows the method 300 of the present invention. At step 305 the UE determines whether or not the DCI format for UL grant (e.g. DCI format 0) is to contain the PDCCH carrier indicator field 115 and the PHICH carrier indicator bit 120. This step can be performed via higher layer signalling, such as via RRC, directly to the UE. If at step 305 it is determined that the PDCCH carrier indicator field 115 exists in the DCI format for UL grant, then control moves to step 310 where, in a sub-frame n, the UE detects and decodes UL grant with the PDCCH carrier indicator field 115 and the PHICH carrier indicator bit 120 on a DL component carrier. Control then moves to step 315, in a sub frame n+4, where the UE transmits PUSCH on the UL component carrier indicated by the PDCCH carrier indicator field 115. Control then moves to step 320 where the UE determines if the PHICH carrier indicator bit 120 (decoded at step 310) indicates that dynamic linkage or cell-specific linkage should be used. If at step 320 it is determined that the PHICH carrier indicator bit 120 indicates that dynamic linkage should be used, control moves to step 325, in a sub-frame n+8, where the UE detects and decodes PHICH on the same DL component carrier as was used for the UL grant detected at step 310. The UE identifies its PHICH resource on the DL component carrier (PHICH group index and sequence index in the same way as release 8 of LTE) and detailed in Section 9.1.2 of TS36.213 v8.7.0, in which the PHICH resource is determined from lowest index Physical Resource Block (PRB) of the uplink resource allocation and the 3-bit uplink demodulation reference symbol (DMRS) cyclic shift associated with the PUSCH transmission, both indicated in the PDCCH with DCI format 0 granting the PUSCH transmission.

The PHICH resource is identified by the index pair ($n_{PHICH}^{group}$, $n_{PHICH}^{seq}$) where $n_{PHICH}^{group}$ is the PHICH group number and $n_{PHICH}^{seq}$ is the orthogonal sequence index within the group as defined by:

$$n_{PHICH}^{group} = (I_{PRB\_RA}^{lowest\_index} + n_{DMRS}) \bmod N_{PHICH}^{group} + I_{PHICH} N_{PHICH}^{group}$$

$$n_{PHICH}^{seq} = (\lfloor I_{PRB\_RA}^{lowest\_index} / N_{PHICH}^{group} \rfloor + n_{DMRS}) \bmod 2N_{SF}^{PHICH}$$

where $n_{DMRS}$ is mapped from the cyclic shift for DMRS field in the most recent DCI format 0 for the transport block associated with the corresponding PUSCH transmission. For a semi-persistently configured PUSCH transmission on subframe n in the absence of a corresponding PDCCH with a DCI Format 0 in subframe $n-k_{PUSCH}$ or a PUSCH transmission associated with a random access response grant, $n_{DMRS}$ is set to zero where $k_{PUSCH}$ is as defined in section 8 in TS36.212.

$N_{SF}^{PHICH}$ is the spreading factor size used for PHICH modulation as described in section 6.9.1 in TS36.211.

$I_{PRB\_RA}^{lowest\_index}$ is the lowest PRB index in the first slot of the corresponding PUSCH transmission $N_{PHICH}^{group}$ is the number of PHICH groups configured by higher layers as described in section 6.9 of TS36.211, $$I_{PHICH} = \begin{cases} 1 & \text{for } TDD\ UL/DL \text{ configuration } 0 \text{ with } PUSCH \\ & \text{transmission in subframe } n = 4 \text{ or } 9 \\ 0 & \text{otherwise} \end{cases}$$

Alternatively, if at step 320 the UE determined the PHICH carrier indicator bit 120 indicated cell-specific linkage, control moves to step 330 where, in a sub-frame n+8, the UE decodes the PHICH on the DL component carrier with cell-specific association with UL component carrier used for PUSCH transmission as determined at step 315. The UE identifies its PHICH resource on the DL component carrier (PHICH group index and sequence index) in the same way as LTE release 8 as described above.

If at step 305 the UE determines it is not required to detect UL grant with the PDCCH carrier indicator field 115 (e.g. sub-frame 100 as shown in FIG. 1A or 1B) control moves to step 335 where, in sub-frame n, for a DL component carrier the UE detects and decodes UL grant without the PDCCH carrier indicator field (115) and the PHICH carrier indicator bit (120) on a DL component carrier. Control then moves to step 340 where, in a sub-frame n+4, the UE transmits PUSCH on the UL component carrier which is linked to the DL component carrier in a cell-specific manner (cell-specific being the default method). Advantageously, without the PDCCH carrier indicator, selecting cell-specific as the default method provides the simplest method for the UE to determine which UL component carrier is associated with a DL component carrier.

Control then moves to step 345 where, in a sub-frame n+8, the UE detects and decodes the PHICH on the DL component carrier which is linked to the UL component carrier used for PUSCH transmission in step 340 (which is the same as the DL component carrier where the UL grant was detected in step 335). The UE identifies its PHICH resource on the DL component carrier (PHICH group index and sequence index) in the same way as long term evolution release 8 as described above.

Advantageously, a single PHICH carrier indicator bit 120 efficiently allows two different methods of PHICH carrier linkage to be configured.

Although the exemplary embodiments of the invention have been disclosed for illustrative purposes, those skilled in the art will appreciate that various modifications, additions and substitutions are possible without departing from the scope of the present invention. Therefore, the present invention is not limited to the above-described embodiments but is defined by the following claims.

INCORPORATION BY REFERENCE

This application is based upon and claims the benefit of priority from Australian provisional patent application No. 2009903829, filed on Aug. 14, 2009, the disclosure of which is incorporated herein in its entirety by reference.

INDUSTRIAL APPLICABILITY

The present invention is applicable to wireless communications systems, and more particularly to a method for configuring the downlink component carrier between one or more Physical Hybrid-ARQ Indicator Channel (PHICH) carrier linkage methods.

REFERENCE SIGNS LIST 100, 110 SUB-FRAME
105 DCI PAYLOAD

115 PDCCH CARRIER INDICATOR FIELD
120 PHICH CARRIER INDICATOR BIT
200 DL CARRIER COMPONENT
205 UL CARRIER COMPONENT
215 DYNAMIC LINKAGE
220 CELL-SPECIFIC LINKAGE

The invention claimed is:

1. A method implemented in a wireless communication network of configuring a downlink (DL) component carrier between one or more linkage methods for PHICH (physical hybrid-ARQ (automatic repeat request) indicator channel) reception on user equipment (UE) the UE being configured for carrier aggregation, the method comprising:
    (a) providing an indicator from a base station to the UE;
    (b) determining, at the UE and based on a value of the indicator, whether a PHICH carrier linkage is either dynamic or cell specific; and
    upon a determination from said determining step that said PHICH carrier linkage is dynamic, transmitting to the UE a PHICH on a DL component carrier used for uplink (UL) grant transmission, and
    upon a determination from said determining step that said PHICH carrier linkage is cell specific, linking a DL component carrier used for PHICH reception to an UL component carrier used for PUSCH transmission in a cell-specific manner,
    wherein the indicator is a single bit located in a DCI (downlink control information) format for an uplink (UL) grant.

2. The method of claim 1, wherein if the single bit is introduced in the DCI format for the UL grant, the single bit exists in the DCI format only if a PDCCH (Physical Downlink Control Channel) carrier indicator exists.

3. The method of claim 1, further comprising:
    setting, at the base station, the PHICH carrier linkage as determined in (b).

4. A method implemented in user equipment used in a wireless communication network, of configuring a downlink (DL) component carrier between one or more linkage methods for PHICH (physical hybrid-ARQ (automatic repeat request) indicator channel) reception, the UE being configured for carrier aggregation, the method comprising:
    (a) receiving an indicator from a base station; and
    (b) determining whether a PHICH carrier linkage is either dynamic or cell specific, based on a value of the indicator,
    wherein, upon a determination from said determining step that said PHICH carrier linkage is dynamic, a same DL component carrier as that used for transmission of an UL grant is used for PHICH transmission to the UE, and
    wherein, upon a determination from said determining step that said PHICH carrier linkage is cell specific, the DL component carrier for PHICH reception is linked to an UL component carrier used for PUSCH transmission in a cell-specific manner,
    wherein the indicator is a single bit located in a DCI (downlink control information) format for the uplink (UL) grant.

5. The method of claim 4, wherein if the single bit for the indicator is introduced in the DCI format for the UL grant, the single bit exists in the DCI format only if a PDCCH (Physical Downlink Control Channel) carrier indicator exists.

6. The method of claim 4, further comprising:
    setting the PHICH carrier linkage as determined in (b).

7. A method implemented in a base station used in a wireless communication network, of configuring a downlink (DL) component carrier between one or more linkage methods for PHICH (physical hybrid-ARQ (automatic repeat request) indicator channel) reception on user equipment (UE), the UE being configured for carrier aggregation, the method comprising:
    providing an indicator from the base station to the UE,
    wherein the UE determines whether a PHICH carrier linkage, based on a value of the indicator, is either dynamic or cell specific,
    wherein, when said PHICH carrier linkage is determined as dynamic, a same DL component carrier as that used for transmission of an UL grant is used for PHICH transmission to the UE, and
    wherein, when said PHICH carrier linkage is determined as cell specific, the DL component carrier for PHICH reception is linked to an UL component carrier used for PUSCH transmission in a cell-specific manner,
    wherein the indicator is a single bit located in a DCI (downlink control information) format for the uplink (UL) grant.

* * * * *